(12) United States Patent
Liao

(10) Patent No.: US 9,552,377 B2
(45) Date of Patent: Jan. 24, 2017

(54) METHOD FOR NAMING IMAGE FILE

(71) Applicant: AVISION INC., Hsinchu (TW)

(72) Inventor: Chun-Chieh Liao, Hsinchu (TW)

(73) Assignee: Avision Inc. (TW)

( * ) Notice: Subject to any disclaimer, the term of this patent is extended or adjusted under 35 U.S.C. 154(b) by 290 days.

(21) Appl. No.: 14/330,920

(22) Filed: Jul. 14, 2014

(65) Prior Publication Data

US 2015/0046488 A1 Feb. 12, 2015

(30) Foreign Application Priority Data

Aug. 8, 2013 (TW) .............................. 102128475 A

(51) Int. Cl.
*G06F 17/30* (2006.01)
(52) U.S. Cl.
CPC .............................. *G06F 17/30268* (2013.01)
(58) Field of Classification Search
CPC .............................................. G06F 17/30268
See application file for complete search history.

(56) References Cited

U.S. PATENT DOCUMENTS

2006/0290789 A1 12/2006 Ketola
2010/0215272 A1 8/2010 Isaev et al.

FOREIGN PATENT DOCUMENTS

TW 200608230 A 3/2006
TW 200941404 A 10/2009

OTHER PUBLICATIONS

Avision Inc., "Button Manager V2 User's Manual", 2012, 7 pgs.

*Primary Examiner* — Grace Park

(57) ABSTRACT

A method for naming an image file comprises the steps of: searching for a keyword string in initial scan image data; identifying an encoded string after the keyword string; and generating an initial file corresponding to the initial scan image data. If the keyword string is found, a file name of the initial file is automatically set up according to the encoded string.

8 Claims, 5 Drawing Sheets

METHOD FOR NAMING IMAGE FILE

This application claims priority of No. 102128475 filed in Taiwan R.O.C. on Aug. 8, 2013 under 35 USC 119, the entire content of which is hereby incorporated by reference.

BACKGROUND OF THE INVENTION

Field of the Invention

The present invention relates to a method for naming an image file, and more particularly to a method for automatically naming an image file according to contents of the image file.

Related Art

In the electronic era, it is an unavoidable trend to manage the paper files by way of image data storage in order to decrease the inventory of the paper documents and the risk that the paper documents tend to be damaged. After the data electrization of the paper documents, the document flow records can be saved and the electric files can be generated to facilitate the document filing and inquiry. However, in order to input a lot of documents into the computer and perform the classification, filing and naming, a lot of manpower and cost are often spent. When a conventional scanner scans a plurality of documents, a file can be generated for each page of scan image data, or all the image data can be merged into a file. It is inconvenient to the user when either method is adopted because the former requires the renaming after the files are viewed, and the later requires the separation of the file. So, the conventional methods are complicated and inefficient.

In order to solve this problem, the concept of automatic filing is proposed. For example, when a stack of documents are ready for scan, a blank page or a specific color page is firstly inserted between the documents at a predetermined file separating location, or a barcode is adhered to one of the documents. When the scanner scans the blank page, specific color page or barcode, a plurality of scan image data is merged into an independent file. However, such the filing method is only for the purpose of rapid file separation, cannot name the file according to the texts on the documents, and cannot judge the associated image data. Therefore, the contents of the image data still have to be viewed one by one, and a new file name is given to each group of the image data.

SUMMARY OF THE INVENTION

Accordingly, the present invention has been proposed to solve the problems of the prior art, and it is an object of the present invention to provide a method for naming an image file, in which a keyword string in scan image data is searched, and an encoded string after the keyword string is identified to generate the file automatically named according to the encoded string.

According to an aspect of the present invention, a method for naming an image file is provided. The method comprises the steps of: searching for a keyword string in initial scan image data, and identifying an encoded string after the keyword string; and generating an initial file corresponding to the initial scan image data, wherein if the keyword string is found, a file name of the initial file is automatically set up according to the encoded string.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

The method of the present invention for naming an image file is applied to the filing and managing of the image data. After a stack of documents are scanned, a keyword string in the scan image data is searched, and a file is generated according to an encoded string after the keyword string, and is automatically named according to the encoded string. For example, if a stack of documents have the following strings in order: Quotation number 001, Quotation number 002, Quotation number 003, then the "Quotation number" is assigned as the keyword string, and the files generated by the scan image data corresponding to this stack of documents are automatically named as 001, 002, 003. However, the naming according to the encoded string is not particularly restricted to the naming only completely according to the encoded string, and some modifications may be made based on the encoded string. For example, if the encoded string is 001, then the file name may be 001-1, PR-001, quotation 001 or the like.

The advantage of searching for the keyword string and naming according to the encoded string after the keyword string is that the user can easily understand the contents of these files and needs not to waste the additional time to rename the files. For example, if a stack of paper quotations, having similar properties but pertaining to different cases, are scanned to form the scan image data, the scan image data of these quotations have the same keyword string (e.g., quotation number), and the encoded string after the keyword string is the case number, then the method of the present invention can be used to rapidly generate a series of files and automatically name each image data according to the case number.

While the present invention will be described by way of examples and in terms of preferred embodiments, it is to be understood that the present invention is not limited thereto. In the following embodiments, the scan image data generated by a scanner will be described as an example, which does not intend to restrict the present invention to the application of the scanner for scanning documents. Instead, as long as the image data of any document can be recognized and edited by the computer software, the method of naming the image data according to the present invention can be applied. For example, the present invention may be applied to the case in which the documents are photographed by a digital camera.

Figure 1:
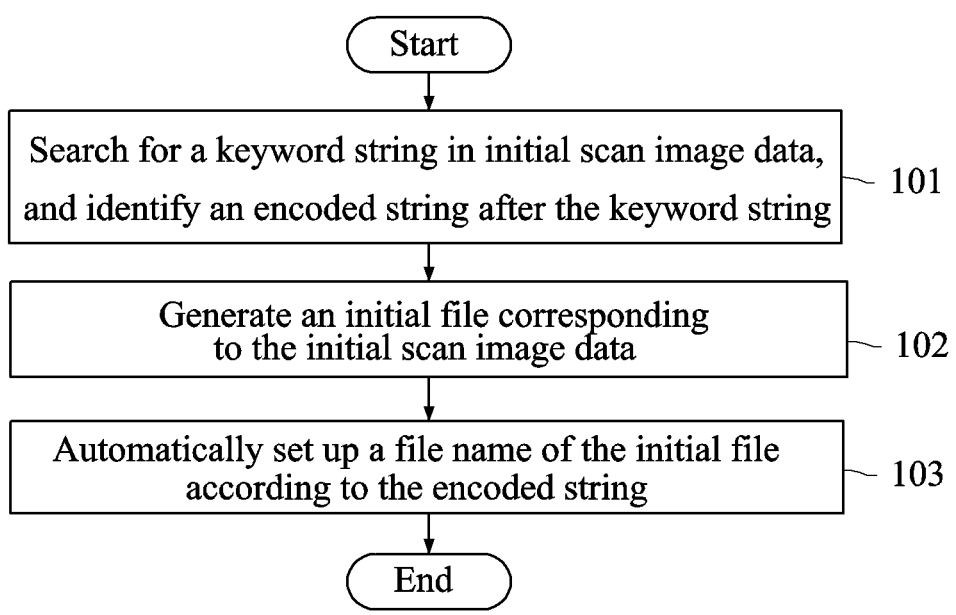
FIG. 1 shows a flow chart of each step of a method for naming an image file according to a first embodiment of the present invention.

FIG. 1 shows a flow chart of each step of a method for naming an image file according to a first embodiment of the present invention. In step 101 of FIG. 1, a keyword string is searched in initial scan image data, and an encoded string after the keyword string is identified. For example, the initial scan image data contains a paragraph of texts of Quotation number 001. If the "Quotation number" is the keyword string, then "001" is the encoded string of the keyword string. In step 102, an initial file corresponding to the initial scan image data is generated. The initial file may be, for example but without limitation to, the electric file having the text format, such as searchable PDF or ".rtf" file. In the step 101, if the keyword string is found, then step 103 is performed to automatically set up a file name of the initial file according to the encoded string. The file name is generated according to, but without limitation to, the encoded string, and other modifications may be made based on the encoded string. For example, if the encoded string is 001, then the file name may be 001-1, PR-001, quotation 001, or the like.

Figure 2:
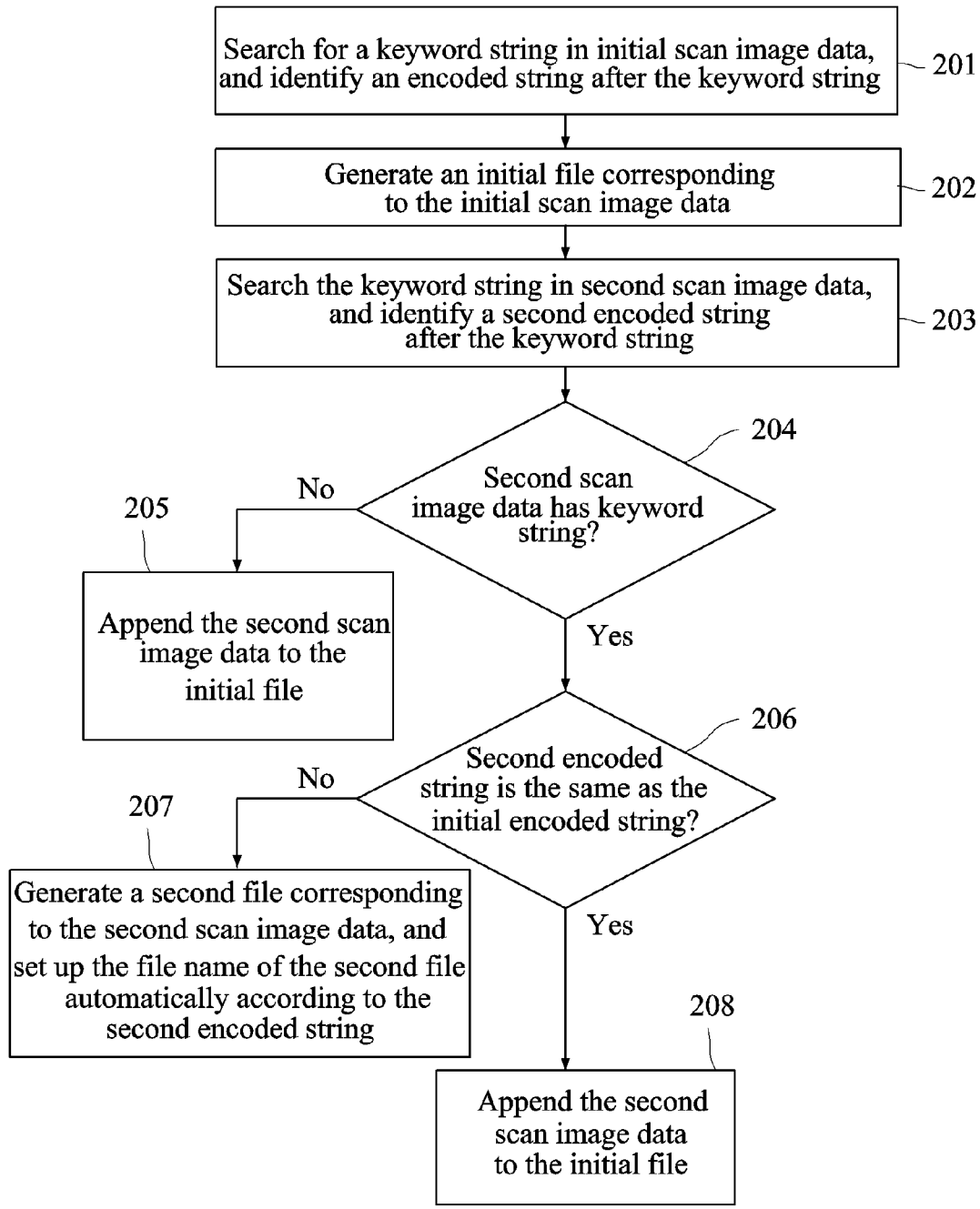
FIG. 2 shows a flow chart of each step of a method for naming an image file according to a second embodiment of the present invention.

The present invention further provides a second embodiment. FIG. 2 shows a flow chart of each step of a method for naming an image file according to the second embodiment of the present invention. Referring to FIG. 2, the method comprises steps 201 to 208, wherein the steps 201, 202 are the same as the steps 101, 102 of the first embodiment. In the step 203, the present invention further comprises searching the keyword string in second scan image data, and identifying a second encoded string after the keyword string. The second scan image data is another set of scan image data following the initial scan image data. In the step 204, if a keyword string is found in the second scan image data, and the second encoded string after the identifying of the step 206 is different from the encoded string of the initial scan image data of the step 201, then the step 207 is performed to generate a second file corresponding to the second scan image data, and to set up the file name of the second file automatically according to the second encoded string. The file name of the second file may be set up according to the method of naming the initial file to form a series of files. For example, the encoded strings of the initial scan image data and the second scan image data are 001 and 002, respectively. If the initial file name is set as 001-1, then the second file name is set as 002-1; and if the initial file name is set as quotation 001, then the second file name is set as quotation 002. According to this method, a stack of documents having keywords can be scanned to generate files named sequentially and automatically.

Referring again to FIG. 2, in the step 204, if the keyword string is found in the second scan image data and the second encoded string after the identifying of the step 206 is the same as the encoded string of the initial scan image data of the step 201, then the step 208 is performed to append the second scan image data to the initial file, rather than to generate an independent second file. For example, the initial file is originally a PDF format file, which contains the initial scan image data and contains only one page. After the second scan image data is appended to the initial file, the initial scan image data and the second scan image data are a first page and a second page of the PDF file, respectively. If the third scan image data following the second scan image data also has the keyword and the encoded string the same as those of the initial scan image data, then the third scan image data is again appended to the initial file to form a third page until the encoded string of the next scan image data is different from the encoded string of the initial scan image and a new file is generated.

Referring again to FIG. 2, in the step 203, the keyword string in the second scan image data is searched, and a second encoded string after the keyword string is identified. In step 204, if the keyword string is not found in the second scan image data, then step 205 is performed to append the second scan image data to the initial file to obtain a merged file. In addition, the second scan image data without the keyword string is the scan image data generated after the initial scan image data. That is, the initial scan image data and the second scan image data are generated in one single scan operation of scanning a plurality of documents comprising a first document and a following second document. The scan operation is usually performed in a sheet-fed scanner. The initial scan image data has the keyword string while the second scan image data does not have the keyword string. This condition occurs when a main document and its attachment without the keyword string are scanned, for example.

Figure 3:
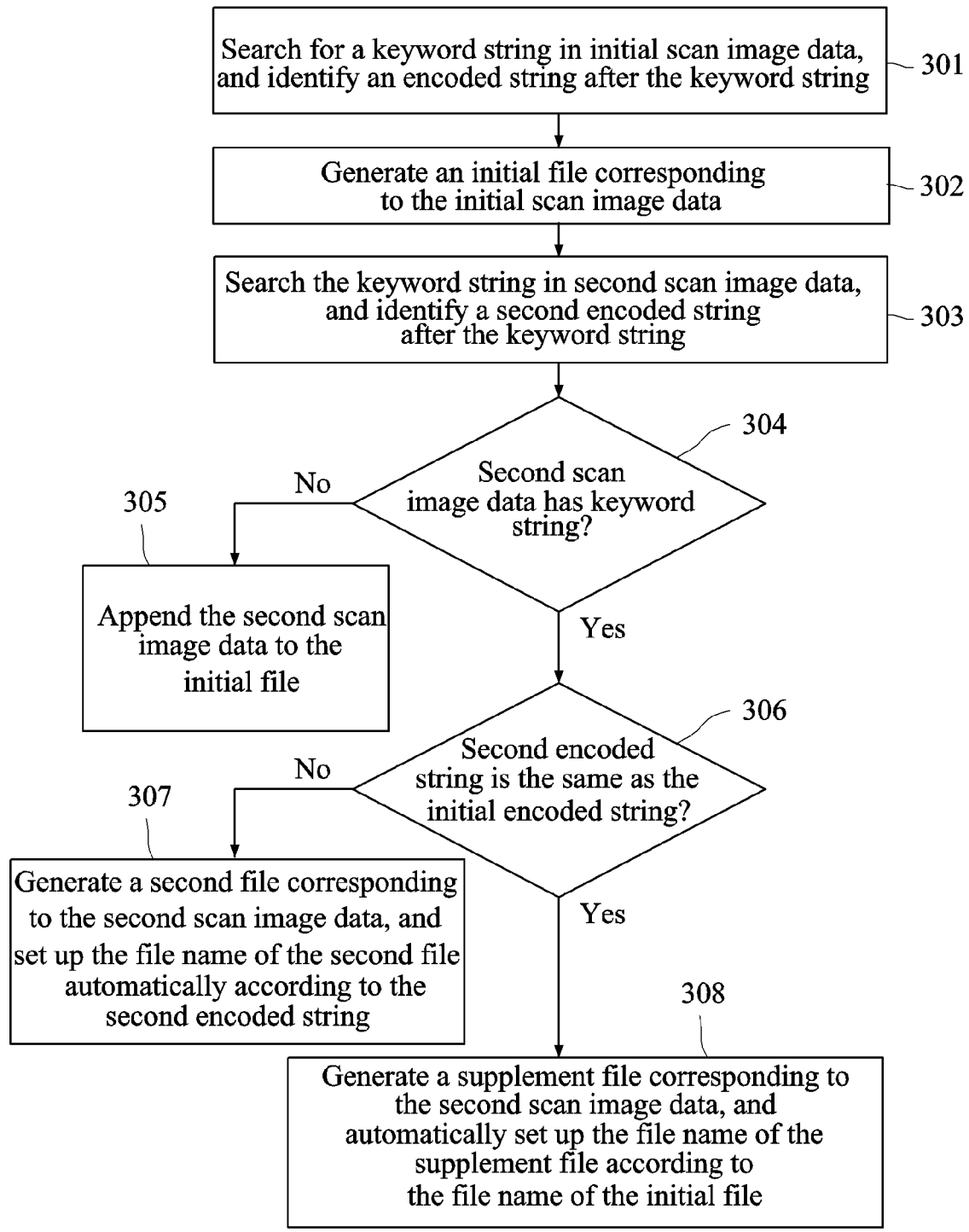
FIG. 3 shows a flow chart of each step of a method for naming an image file according to a third embodiment of the present invention.

The present invention further provides a third embodiment. FIG. 3 shows a flow chart of each step of a method for naming an image file according to the third embodiment of the present invention. Referring to FIG. 3, steps 301 to 307 of the third embodiment are completely the same as the steps 201 to 207 of the second embodiment, and the difference between the third and second embodiments resides in step 308. In the step 304, if the keyword string is found in the second scan image data and the second encoded string is identified, in the step 306, as the same as the encoded string of the initial scan image data, then the step 308 is performed to generate a supplement file corresponding to the second scan image data. The supplement file is a supplement to the initial file, and the file name of the supplement file is automatically set up according to the file name of the initial file.

Preferably, the supplement file and the initial file have similar file names and may be named in a predetermined rule. For example, if the initial file is named as "001", then the supplement file may be named as "001-1" or "001-a". If the initial file is named as "001-1", then the supplement file may be named as "001-2" or the like. If the third scan image data after the second scan image data also has the keyword string and the encoded string the same as those of the initial scan image data, then the supplement file, such as 001-3, 001-c or the like, is continuously generated according to the same naming rule. These supplement files having the file names similar to that of the initial file may be stored in parallel with other files, or may be regarded as a group based on the initial file, and may be stored to another file folder, whose name may be set up according to the encoded string, together with the initial file.

Figure 4:
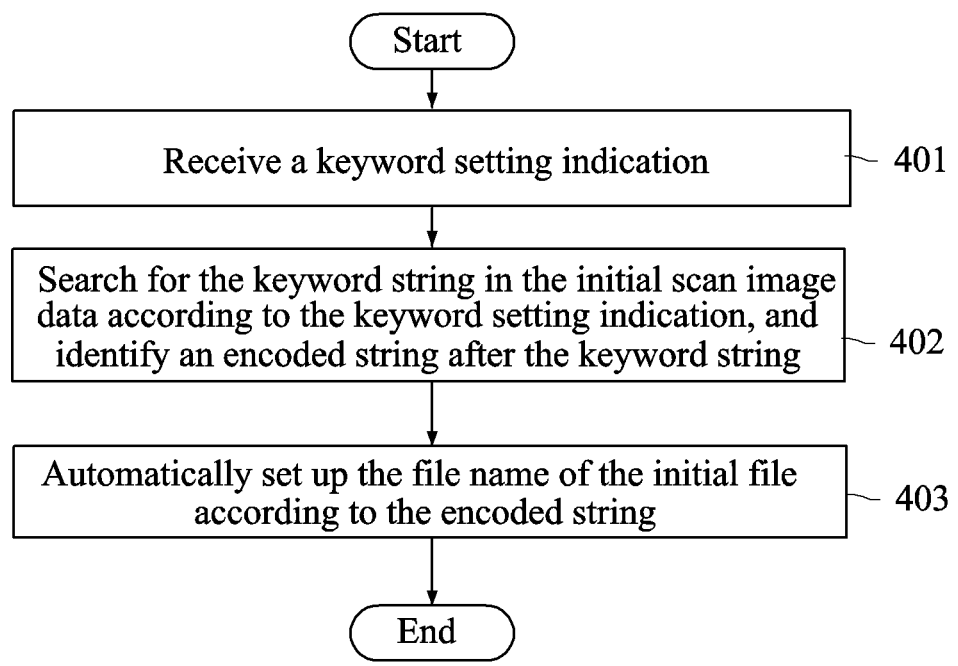
FIG. 4 shows a flow chart of each step of a method for naming an image file according to a fourth embodiment of the present invention.

The present invention further provides a fourth embodiment. FIG. 4 shows a flow chart of each step of a method for naming an image file according to the fourth embodiment of the present invention. Referring to FIG. 4, the method for naming an image file comprises steps 401 to 403. In the step 401, a keyword setting indication is received. The keyword setting indication is, for example, displayed on a user operation interface, on which the user can set up an indication for searching the keyword string. The user operation interface may comprise a display and an input device of a scanner or a peripheral, or a computer connected to the scanner, and the user can use the software operation on the computer to indicate the scanner. In the step 402, the keyword string in the initial scan image data is searched according to the keyword setting indication, and an encoded string after the keyword string is identified. For example, the keyword string is searched by way of an optical character recognition (OCR) or an intelligent character recognition (ICR). In the step 402, if the keyword string is found, then the step 403 is performed to automatically set up the file name of the initial file according to the encoded string.

In the step 401, the keyword setting indication may be made by the user inputting the keyword string to be specified. Alternatively, the scanner firstly generates the initial scan image data displayed on the display, and the user selects the keyword string through the touch screen or the mouse cursor. In another example, the scanner generates at least two sets of scan image data, which are automatically compared with each other and a menu is provided to suggest a selectable keyword string or selectable keyword strings to the user. However, the present invention is not particularly restricted to the above-mentioned methods.

Figures 5A, 5B:
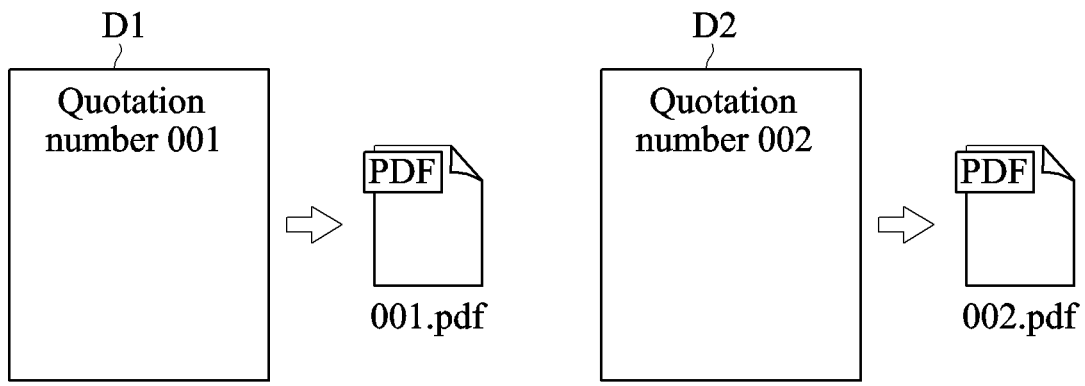
FIGS. 5A to 5E show schematic views of the image data applied to the methods for naming the image files.

FIGS. 5A to 5E show schematic views of the image data applied to the methods for naming the image files. As shown in FIGS. 5A to 5E, the generated files depicted in the drawings have the PDF format, for example. In practice, the present invention is not restricted thereto. In FIG. 5A, D1 may serve as the initial scan image data and have a keyword string "Quotation number" and an encoded string "001" after the keyword string. According to the naming rule of the first embodiment, the initial file name generated in correspondence with the initial scan image data D1 may be 001, PR-001, quotation 001 or the like. In FIG. 5B, D2 is the second scan image data corresponding to D1 and has a keyword string "Quotation number" and an encoded string 002 after the keyword string. According to the naming rule of the second embodiment (step 207), the encoded string 002 of the second scan image data D2 is different from the encoded string 001 of the initial scan image data D1, and the second file name generated in correspondence with the second scan image data D2 may be 002, PR-002, quotation 002 or the like.

Figure 5C:
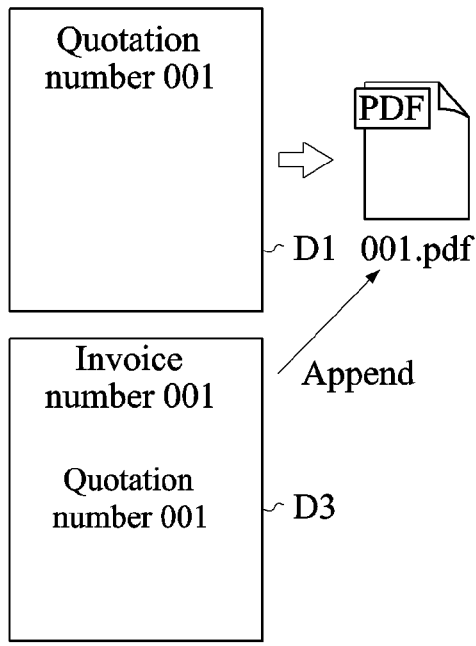
Figure 5D:
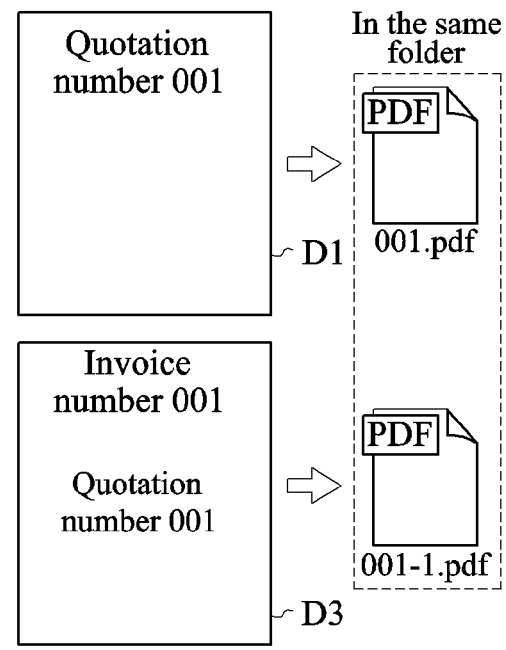

In FIG. 5C, D3 is the second scan image data corresponding to D1, and is an invoice attached to the quotation, for example. Thus, this invoice is also written with the keyword string "Quotation number" and an encoded string 001 after the keyword string. According to the naming rule of the second embodiment (step 208), the encoded string 001 of the second scan image data D3 is the same as the encoded string 001 of the initial scan image data D1, and the second scan image data D3 may be appended to the initial file. Alternatively, as shown in FIG. 5D, according to the naming rule of the third embodiment (step 308), the encoded string 001 of the second scan image data D3 is the same as the encoded string 001 of the initial scan image data D1, and a supplement file, whose file name may be 001-1, 001-a or the like, may be generated according to the second scan image data D3. In FIG. 5D, the initial file and the supplement file may be stored in parallel with other files, and may also be regarded as an associated group and stored in the same file folder, whose name may be set up according to the encoded string 001.

Figure 5E:
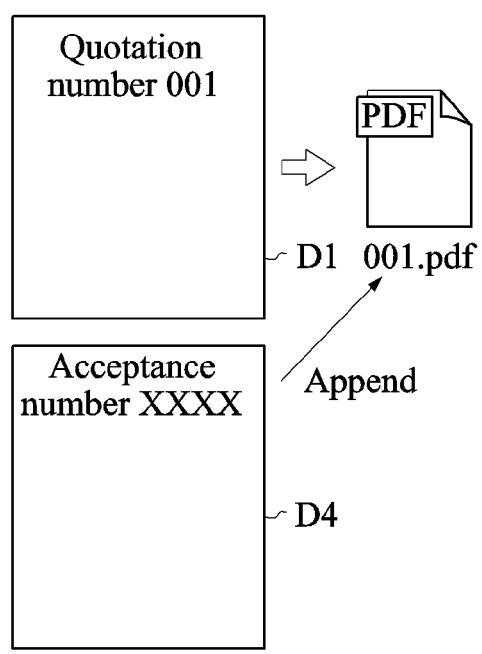

In FIG. 5E, D4 is the scan image data generated after the initial scan image data and does not contain the keyword string. If D4 is a next set of image data obtained in the subsequent scan after the initial scan image data D1, then the scan image data D4 is appended to the initial file to obtain a merged file according to the naming rule of the second embodiment (step 205). If D4 is a next set of image data obtained in the subsequent scan after the scan image data D3, then the scan image data D4 is still appended to the initial file to obtain a merged file because the scan image data D3 is merged into the initial scan image data D1 or a supplement file is generated.

If D4 is not a next set of image data obtained in the subsequent scan after the scan image data D1 or D3 but is a next set of image data obtained in the subsequent scan after the scan image data D2, then the scan image data D4 may be appended to the second file to obtain a merged file.

The method for naming an image file according to each embodiment of the present invention is applied to the filing and managing of the image data, and can automatically generate a file or files for the image data having the keyword string, wherein the associated documents may be merged into the same file or the supplement file can be generated without the need of inserting a blank page or a specific color page between the documents or adhering a barcode onto the document. In addition, the image data stored in the file can be directly distinguished according to the file name, and the subsequent file management is facilitated.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A method for naming an image file, the method comprising:
   searching for a keyword string in initial scan image data, and identifying an encoded string after the keyword string;
   generating an initial file corresponding to the initial scan image data, wherein if the keyword string is found, a file name of the initial file is automatically set up according to the encoded string;
   searching for the keyword string in second scan image data, and identifying a second encoded string after the keyword string; and
   appending the second scan image data to the initial file if the keyword string is found and the second encoded string is identified as the same as the encoded string.

2. The method according to claim 1, further comprising:
   generating a second file corresponding to the second scan image data and automatically setting up a file name of the second file according to the second encoded string if the keyword string is found and the second encoded string is identified as different from the encoded string.

3. The method according to claim 1, further comprising:
   receiving a keyword setting indication; and
   searching for the keyword string in the initial scan image data according to the keyword setting indication.

4. A method for naming an image file, the method comprising:
   searching for a keyword string in initial scan image data, and identifying an encoded string after the keyword string;
   generating an initial file corresponding to the initial scan image data, wherein if the keyword string is found, a file name of the initial file is automatically set up according to the encoded string;
   searching for the keyword string in second scan image data, and identifying a second encoded string after the keyword string; and generating a supplement file corresponding to the second scan image data and automatically setting up a file name of the supplement file according to the file name of the initial file if the keyword string is found and the second encoded string is identified as the same as the encoded string.

5. The method according to claim 4, further comprising:
receiving a keyword setting indication; and
searching for the keyword string in the initial scan image data according to the keyword setting indication.

6. A method for naming an image file, the method comprising:
searching for a keyword string in initial scan image data, and identifying an encoded string after the keyword string;
generating an initial file corresponding to the initial scan image data, wherein if the keyword string is found, a file name of the initial file is automatically set up according to the encoded string;
searching for the keyword string in second scan image data; and
appending the second scan image data to the initial file if the keyword string is not found.

7. The method according to claim 6, further comprising:
receiving a keyword setting indication; and
searching for the keyword string in the initial scan image data according to the keyword setting indication.

8. The method according to claim 6, wherein the second scan image data is scan image data generated after the initial scan image data.

* * * * *